US012679668B2

(12) United States Patent
Shindo

(10) Patent No.: US 12,679,668 B2
(45) Date of Patent: Jul. 14, 2026

(54) SUBSTRATE TRANSFER DEVICE AND SUBSTRATE TRANSFER METHOD

(71) Applicant: Tokyo Electron Limited, Tokyo (JP)

(72) Inventor: Takehiro Shindo, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 411 days.

(21) Appl. No.: 18/055,899

(22) Filed: Nov. 16, 2022

(65) Prior Publication Data

US 2023/0166924 A1     Jun. 1, 2023

(30) Foreign Application Priority Data

Nov. 30, 2021     (JP) .................................. 2021-194651

(51) Int. Cl.
B65G 47/90          (2006.01)

(52) U.S. Cl.
CPC ..................................... B65G 47/90 (2013.01)

(58) Field of Classification Search
None
See application file for complete search history.

(56) References Cited

U.S. PATENT DOCUMENTS

| | | | | | |
|---|---|---|---|---|---|
| 6,856,858 | B2 * | 2/2005 | Kurita | ................. | H10P 72/0606 |
| | | | | | 700/218 |
| 7,628,574 | B2 * | 12/2009 | Pak | .................... | H10P 72/0478 |
| | | | | | 414/217 |
| 10,718,491 | B1 * | 7/2020 | Raring | ................. | H04B 10/116 |

| | | | | | |
|---|---|---|---|---|---|
| 2001/0021621 | A1 * | 9/2001 | Moore | .................. | B24B 37/013 |
| | | | | | 451/8 |
| 2016/0218029 | A1 * | 7/2016 | Janakiraman | ..... | H01L 21/67709 |
| 2016/0378092 | A1 * | 12/2016 | Yamamoto | ........... | G05B 19/404 |
| | | | | | 700/300 |
| 2020/0404184 | A1 * | 12/2020 | Maeda | .................... | G01D 5/145 |
| 2021/0002768 | A1 * | 1/2021 | Takewaki | .............. | H01L 21/324 |
| 2021/0335648 | A1 * | 10/2021 | Wei | .......................... | H01F 7/206 |
| 2023/0036881 | A1 * | 2/2023 | Kowal | .................... | H10N 52/00 |

FOREIGN PATENT DOCUMENTS

| | | |
|---|---|---|
| CN | 104185812 | 12/2014 |
| CN | 112236851 | 1/2021 |
| JP | 2006-332378 | 12/2006 |
| JP | 2013-205550 | 10/2013 |
| JP | 2018-504784 | 2/2018 |
| JP | 2018-142806 | 9/2018 |
| JP | 2018-151565 | 9/2018 |
| JP | 2021-086986 | 6/2021 |
| KR | 10-2017-0106464 | 9/2017 |
| WO | 2016/118335 | 7/2016 |
| WO | 2021/220080 | 11/2021 |

* cited by examiner

*Primary Examiner* — Ariel Mercado-Vargas
(74) *Attorney, Agent, or Firm* — IPUSA, PLLC

(57)          ABSTRACT

A substrate transfer device includes a tile-shaped section that includes a coil and a Hall element and that is provided in a transfer chamber, a transfer section that includes a permanent magnet and that is configured to move over the tile-shaped section to transfer a substrate, a temperature sensor configured to detect a temperature in the tile-shaped section, and a controller configured to estimate a position of the transfer section based on a temperature of the Hall element and a detection value of the Hall element. The temperature of the Hall element is determined based on the temperature detected by the temperature sensor.

7 Claims, 6 Drawing Sheets

SUBSTRATE TRANSFER DEVICE AND SUBSTRATE TRANSFER METHOD

CROSS-REFERENCE TO RELATED APPLICATIONS

This patent application is based on and claims priority to Japanese Patent Application No. 2021-194651 filed on Nov. 30, 2021, the entire contents of which are incorporated herein by reference.

TECHNICAL FIELD

The present disclosure relates to a substrate transfer device and a substrate transfer method.

BACKGROUND

Patent document 1 discloses a substrate transfer device including a transfer section that magnetically floats over a planar motor provided in a transfer chamber to transfer a substrate.

Related Art Document

Patent Document

[Patent Document 1] Japanese Laid-open Patent Application Publication No. 2021-86986

SUMMARY

According to one aspect of the present disclosure, a substrate transfer device includes a tile-shaped section that includes a coil and a Hall element and that is provided in a transfer chamber, a transfer section that includes a permanent magnet and that is configured to move over the tile-shaped section to transfer a substrate, a temperature sensor configured to detect a temperature in the tile-shaped section, and a controller configured to estimate a position of the transfer section based on a temperature of the Hall element and a detection value of the Hall element. The temperature of the Hall element is determined based on the temperature detected by the temperature sensor.

DETAILED DESCRIPTION OF EMBODIMENTS

An embodiment of the present disclosure will be described below with reference to the drawings. In each drawing, the same components are referenced by the same symbols, and duplicate descriptions may be omitted.

Substrate Processing System 100

Figure 1:
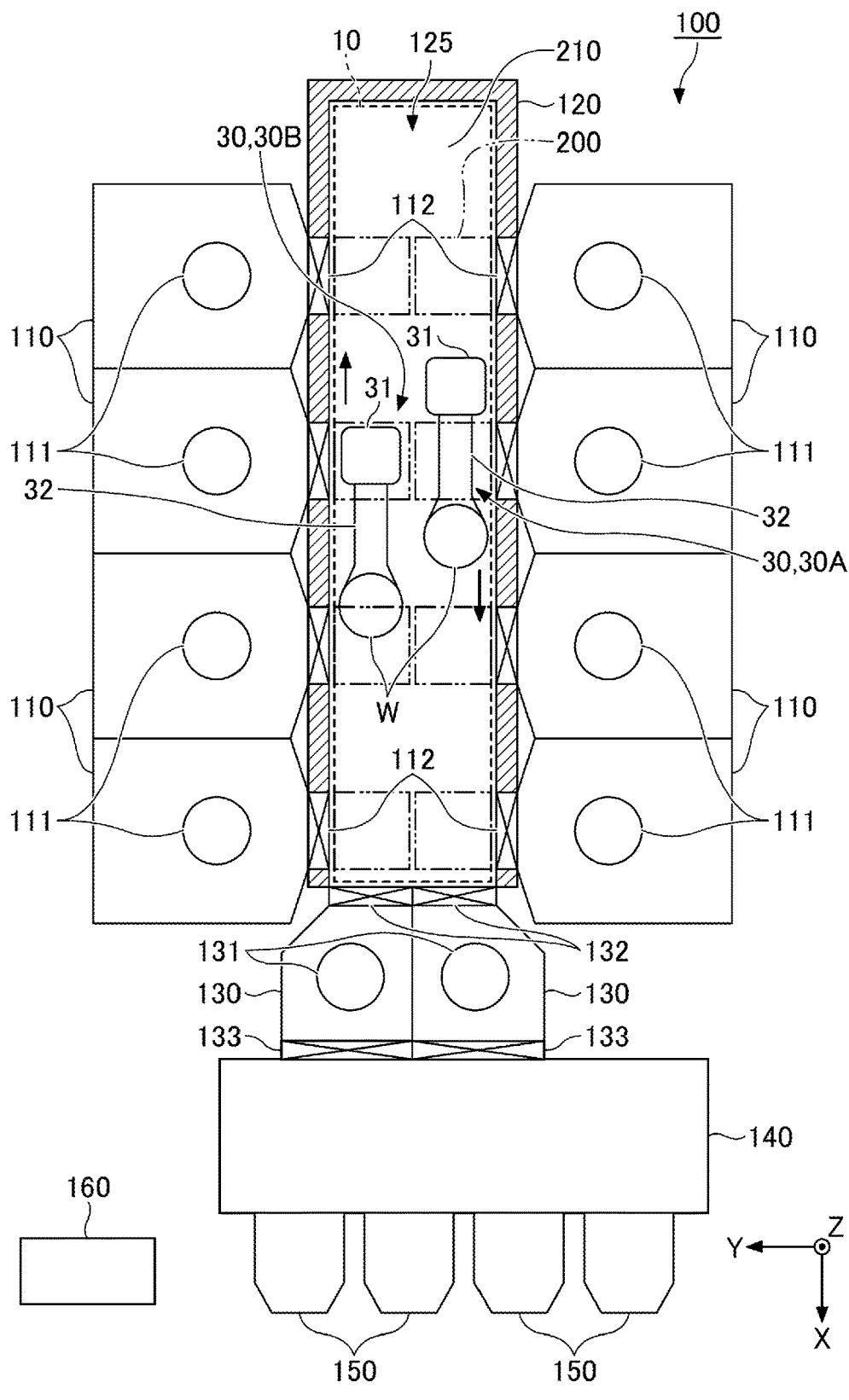
FIG. 1 is a plan view illustrating a configuration of an example of a substrate processing system according to an embodiment.

An example of an entire configuration of a substrate processing system 100 according to one embodiment will be described with reference to FIG. 1. FIG. 1 is a plan view illustrating the configuration of one example of the substrate processing system 100 according to the embodiment.

The substrate processing system 100 illustrated in FIG. 1 is a cluster structure (multi-chamber type) system. The substrate processing system 100 includes multiple processing chambers 110, a vacuum transfer chamber 120, a load lock chamber 130, an atmospheric air transfer chamber 140, a load port 150, and a controller 160. Here, in FIG. 1, the longitudinal direction of the vacuum transfer chamber 120 is defined as the X direction, the short (width) direction of the vacuum transfer chamber 120 is defined as the Y direction, and the height direction of the vacuum transfer chamber 120 is defined as the Z direction.

The processing chamber 110 is decompressed to a predetermined vacuum atmosphere, and a desired process (an etching process, a film deposition process, a cleaning process, an asking process, or the like) is performed on a semiconductor wafer (hereafter, also referred to as a "substrate W") inside the processing chamber 110. The processing chambers 110 are arranged adjacent to the vacuum transfer chamber 120. The processing chamber 110 and the vacuum transfer chamber 120 communicate with each other by opening and closing the gate valve 112. The processing chamber 110 includes a stage 111 on which the substrate W is to be mounted. Here, the operation of each section for processing in the processing chamber 110 is controlled by the controller 160.

The vacuum transfer chamber 120 is connected to multiple chambers (the processing chambers 110 and the load lock chambers 130) through gate valves 112 and 132, and is decompressed to a predetermined vacuum atmosphere. Additionally, inside the vacuum transfer chamber 120, a substrate transfer device 125 that transfers the substrate W is provided. The substrate transfer device 125 includes a planar motor 10 arranged in the vacuum transfer chamber 120 and multiple transfer sections 30 (30A and 30B) movable on the planar motor 10. The transfer section 30 includes a mover 31 movable on the planar motor 10 and an arm 32 configured to hold the substrate W. The substrate transfer device 125 carries in and out the substrate W between the processing chamber 110 and the vacuum transfer chamber 120 in accordance with the opening and closing of the gate valve 112. Additionally, the substrate transfer device 125 carries in and out the substrate W between the load lock chamber 130 and the vacuum transfer chamber 120 in accordance with the opening and closing of the gate valve 132.

Here, the operation of the substrate transfer device 125 and the opening and closing of the gate valves 112 and 132 are controlled by the controller 160. Here, the substrate transfer device 125 (the planar motor 10 and the transfer section 30) will be described later with reference to FIGS. 2 to 4.

Additionally, in the vacuum transfer chamber 120, an accuracy-required area 200 (illustrated by dash-dot-dot-dash lines in FIG. 1) where high position alignment accuracy is required when the transfer section 30 moves is provided. For example, an area including the transfer section 30 located when the transfer section 30 delivers the substrate W to the stage 111 in the processing chamber 110 and/or receives the substrate W from the stage 111 is the accuracy-required area 200 where high position alignment accuracy is required. The position of the transfer section 30, located when the transfer section 30 delivers the substrate W to the stage 131 in the load lock chamber 130 and/or receives the substrate W from the stage 131 may be included in the accuracy-required area 200.

In contrast, in the vacuum transfer chamber 120, a transfer area 210 (an area in the vacuum transfer chamber 120 other than the accuracy-required area 200) connecting the accuracy-required area 200 to another accuracy-required area 200 is a region where the position alignment accuracy of the transfer section 30 is not required to be as high as the position alignment accuracy in the accuracy-required area 200.

The load lock chamber 130 is provided between the vacuum transfer chamber 120 and the atmospheric air transfer chamber 140. The load lock chamber 130 includes a stage 131 on which the substrate W is to be mounted. The load lock chamber 130 is configured to switch between an ambient air atmosphere and a vacuum atmosphere. The load lock chamber 130 and the vacuum transfer chamber 120 that is in the vacuum atmosphere communicate with each other by opening and closing the gate valve 132. The load lock chamber 130 and the atmospheric air transfer chamber 140 that is in the ambient air atmosphere communicate with each other by opening and closing a door valve 133. Here, the switching between the vacuum atmosphere and the ambient air atmosphere in the load lock chamber 130 is controlled by the controller 160.

The atmospheric air transfer chamber 140 is in the ambient air atmosphere, and a downflow of clean air is formed, for example. Additionally, a transfer device (not illustrated) that transfers the substrate W is provided inside the atmospheric air transfer chamber 140. The transfer device (not illustrated) carries in and out the substrate W between the load lock chamber 130 and the atmospheric air transfer chamber 140 in accordance with the opening and closing of the door valve 133. Here, the operation of the transfer device (not illustrated) and the opening and closing of the door valve 133 are controlled by the controller 160.

Additionally, the load port 150 is provided on the wall of the atmospheric air transfer chamber 140. A carrier (not illustrated) accommodating the substrate W or an empty carrier is attached to the load port 150. For example, a front opening unified pod (FOUP) can be used as the carrier.

The transfer device (not illustrated) can take out the substrate W accommodated in the carrier attached to the load port 150 and mount the substrate W on the stage 131 of the load lock chamber 130. Additionally, the transfer device (not illustrated) can take out the substrate W mounted on the stage 131 of the load lock chamber 130 and accommodate the substrate W in the carrier attached to the load port 150.

The controller 160 includes a central processing unit (CPU), a read only memory (ROM), a random access memory (RAM), and a hard disk drive (HDD). The storage area is not limited to the HDD, and the controller 160 may include another storage area such as a solid state drive (SSD). In the storage area such as the HDD and the RAM, a recipe in which process steps, process conditions, and transfer conditions are set is stored.

The CPU controls the processing of the substrate W in each processing chamber 110 according to the recipe, and controls the transfer of the substrate W. A program for processing the substrate W in each processing chamber 110 or transferring the substrate W may be stored in the HDD or RAM. The program may be stored in a storage medium and provided or may be provided from an external device through a network.

Next, an example of the operation of the substrate processing system 100 will be described. Here, as an example of the operation of the substrate processing system 100, an operation of performing processing processing on the substrate W accommodated in the carrier attached to the load port 150 in the processing chamber 110, and accommodating the substrate W in an empty carrier attached to the load port 150 will be described. At the start of the operation, the gate valves 112 and 132 and the door valve 133 are closed, and the inside of the load lock chamber 130 is in the ambient air atmosphere.

The controller 160 opens the door valve 133. The controller 160 controls the transfer device in the atmospheric air transfer chamber 140 to take out the substrate W from the carrier of the load port 150 and mount the substrate W on the stage 131 of the load lock chamber 130. When the substrate W is mounted on the stage 131 of the load lock chamber 130 and the transfer device is retracted from the load lock chamber 130, the controller 160 closes the door valve 133.

The controller 160 controls the exhaust device (not illustrated) of the load lock chamber 130 to exhaust air in the chamber, and switches the load lock chamber 130 from the ambient air atmosphere to the vacuum atmosphere.

Next, the substrate W mounted on the stage 131 of the load lock chamber 130 is transferred to the processing chamber 110 and is mounted on the stage 111. Specifically, the controller 160 opens the gate valve 132. The controller 160 controls the substrate transfer device 125, which will be described later, to insert the arm 32, into the load lock chamber 130, to a preset delivery position, to hold the substrate W mounted on the stage 131 of the load lock chamber 130 and transfer the substrate W to the vacuum transfer chamber 120. When the arm 32 is retracted from the load lock chamber 130, the controller 160 closes the gate valve 132.

The controller 160 opens the gate valve 112 of the processing chamber 110 at the transfer destination. The controller 160 controls the substrate transfer device 125 to insert the arm 32, into the processing chamber 110, to a preset delivery position and mount the held substrate W on the stage 111 of the processing chamber 110. When the arm 32 is retracted from the processing chamber 110, the controller 160 closes the gate valve 112.

The controller 160 controls the processing chamber 110 to perform a desired process on the substrate W.

When the processing of the substrate W completes, the substrate W mounted on the stage 111 of the processing chamber 110 is transferred to the load lock chamber 130 and is mounted on the stage 131. Specifically, the controller 160 opens the gate valve 112. The controller 160 controls the substrate transfer device 125 to insert the arm 32, into the processing chamber 110, to a preset delivery position, hold the substrate W mounted on the stage 111 of the processing chamber 110, and transfer the substrate W to the vacuum transfer chamber 120. When the arm 32 is retracted from the processing chamber 110, the controller 160 closes the gate valve 112.

The controller 160 opens the gate valve 132. The controller 160 controls the substrate transfer device 125 to insert the arm 32, into the load lock chamber 130, to a preset delivery position and mount the held substrate W on the stage 131 of the load lock chamber 130. When the arm 32 is retracted from the load lock chamber 130, the controller 160 closes the gate valve 132.

The controller 160 controls a gas supply device (not illustrated) of the load lock chamber 130 to supply clean air into the chamber, for example, and switch the load lock chamber 130 from the vacuum atmosphere to the ambient air atmosphere.

The controller 160 opens the door valve 133. The controller 160 controls the transfer device (not illustrated) to take out the substrate W mounted on the stage 131 of the load lock chamber 130 and accommodate the substrate W in the carrier of the load port 150. When the substrate W is taken out from the stage 131 of the load lock chamber 130 and the transfer device (not illustrated) is retracted from the load lock chamber 130, the controller 160 closes the door valve 133.

Here, in the substrate processing system 100, the configuration, in which the substrate transfer device 125 transfers the substrate W mounted on the stage 131 of the load lock chamber 130 to the stage 111 of the processing chamber 110 and transfers the processed substrate W from the stage 111 of the processing chamber 110 to the stage 131 of the load lock chamber 130, has been described for example, but the configuration is not limited thereto. The substrate transfer device 125 may be configured to transfer the substrate W mounted on the stage 111 of one processing chamber 110 to the stage 111 of another processing chamber 110.

Substrate Transfer Device 125

Figure 3:
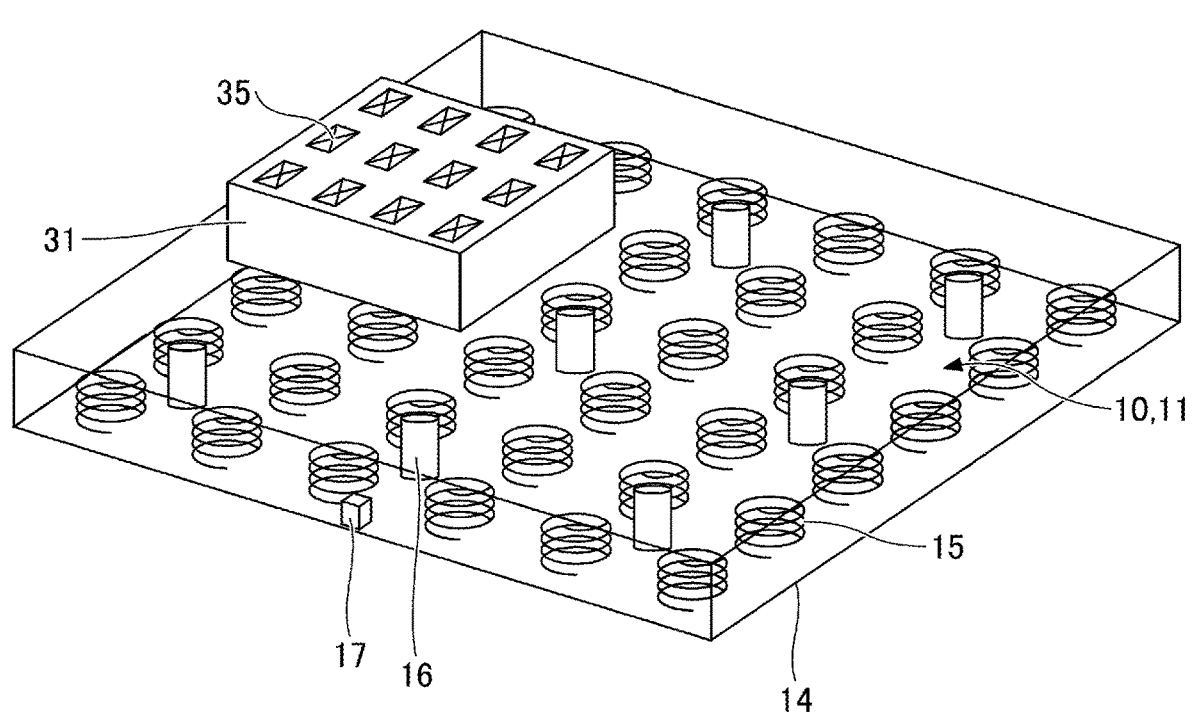
FIG. 3 is a perspective view depicting a drive principle of a substrate transfer device.
Figure 4:
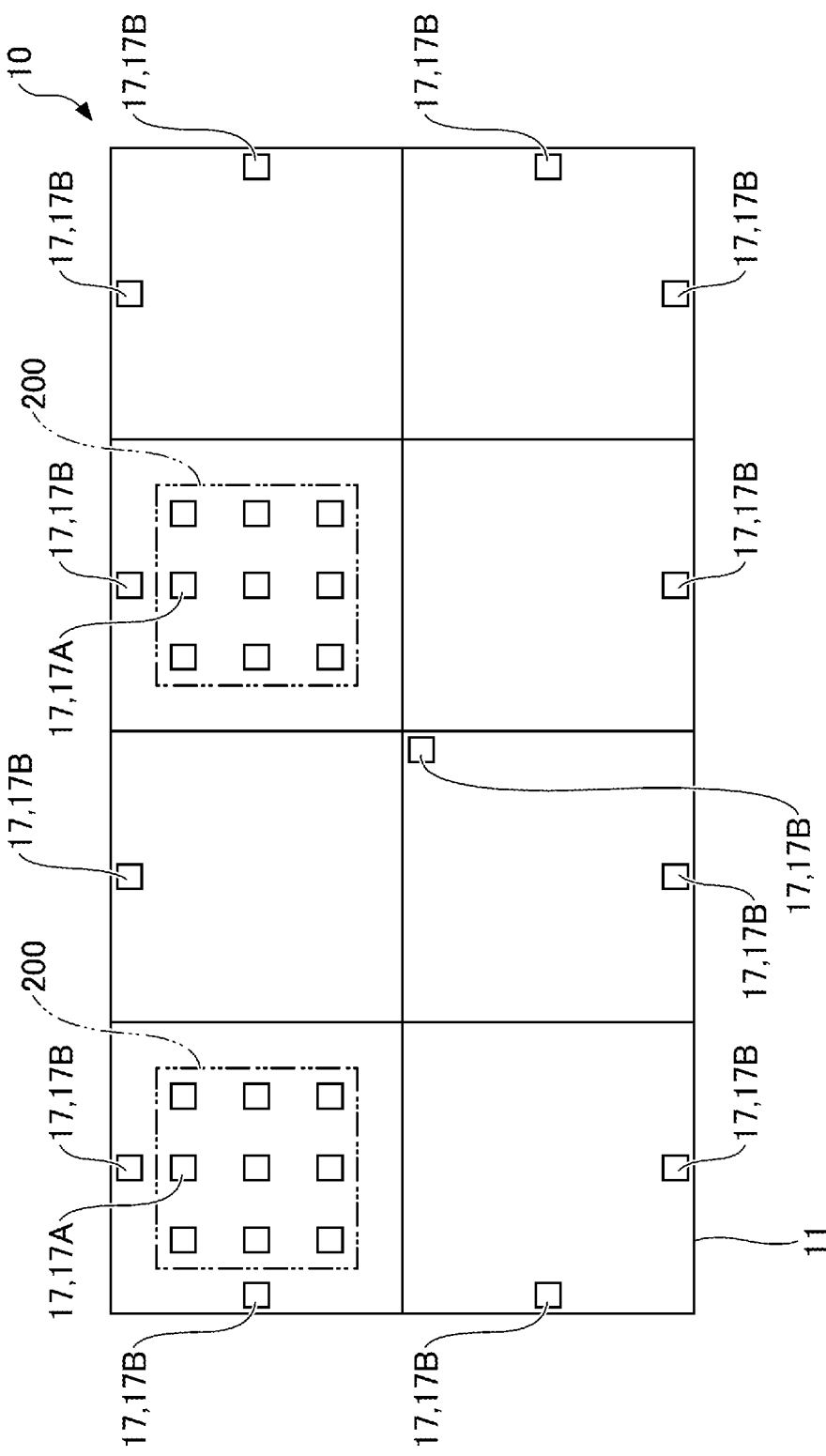
FIG. 4 is an example of a plan view illustrating the arrangement of temperature sensors.

Next, the substrate transfer device 125 will be described further. The substrate transfer device 125 includes the planar motor 10 arranged in the vacuum transfer chamber 120 and the transfer section 30 movable on the planar motor 10. Here, as illustrated in FIG. 4, which will be described later, the planar motor 10 is formed by arraying multiple tile-shaped sections 11 (see FIG. 3) in the vacuum transfer chamber 120.

Figure 2:
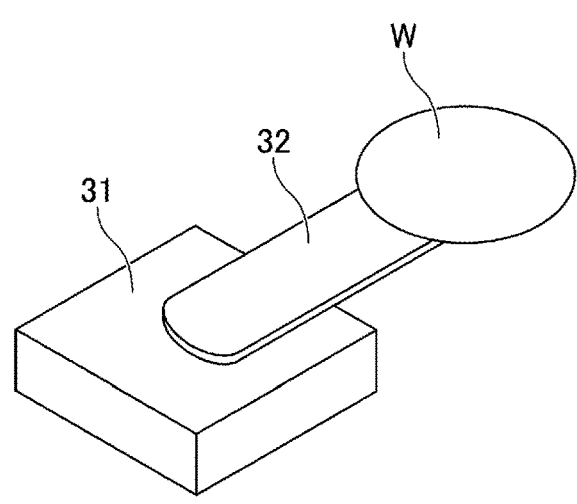
FIG. 2 is a perspective view illustrating an example of a transfer section according to the embodiment.

FIG. 2 is a perspective view illustrating an example of the transfer section 30 according to the embodiment. The transfer section 30 includes the mover 31 and the arm 32. The mover 31 is configured to move by magnetically floating over the planar motor 10. The arm 32 is configured such that the arm 32 is fixed to the mover 31 on one end, and the arm 32 can hold the substrate W on the other end. Additionally, multiple transfer sections 30 may be provided in the vacuum transfer chamber 120.

The tile-shaped section 11 of the planar motor 10 and the mover 31 of the transfer section 30 will be described further with reference to FIG. 3. FIG. 3 is a perspective view depicting the drive principle of the substrate transfer device 125.

In the tile-shaped section 11 of the planar motor 10, multiple coils 15 are arrayed in a housing 14 formed of non-magnetic metal or resin. The coil 15 generates a magnetic field by being supplied with an electric current. The controller 160 (see FIG. 1) is configured so that current values to be applied to the respective coils 15 can be controlled individually.

In the mover 31, multiple permanent magnets 35 are arrayed. The magnetic field generated by the coil 15 causes the mover 31 to magnetically float over the tile-shaped section 11. Additionally, the magnetic field generated by the coil 15 allows the mover 31 to move over the tile-shaped sections 11 and move over the planar motor 10 formed by the multiple tile-shaped sections 11.

With such a configuration, the controller 160 (see FIG. 1) is configured to control the current values of the respective coils 15 of the planar motor 10 (the tile-shaped sections 11), so that the position and orientation of the transfer section 30 (the mover 31) can be controlled. The position may be the position in the horizontal direction (the X-axis direction and the Y-axis direction) and the position in the height direction (the Z-axis direction) (the floating amount) of the transfer section 30. The orientation may be the tilt around the X-axis, the tilt around the Y-axis, and the tilt around the Z-axis of the transfer section 30.

Additionally, with respect to the tile-shaped section 11, multiple Hall elements (the position detecting sensors) 16 are provided in the housing 14. The Hall element 16 is an example of a magnetic sensor for detecting the position and orientation of the mover 31. That is, the Hall element 16 detects a detection value (a Hall voltage) corresponding to the magnetic flux density formed by the permanent magnet 35 of the mover 31. The detection value of the Hall element 16 is input to the controller 160 (see FIG. 1). The controller 160 calculates the magnetic flux densities at the positions (the magnetic flux measurement positions) of respective Hall elements 16 based on the detection values of the multiple Hall elements 16, and estimates the position and orientation of the mover 31 based on the calculated magnetic flux densities at the multiple magnetic flux measurement positions.

Here, multiple coils 15 and multiple Hall elements 16 are provided in the housing 14 of the tile-shaped section 11. Additionally, when the transfer section 30 is caused to float and move over the planar motor 10, the coil 15 corresponding to the position of the transfer section 30 is energized. When the coil 15 is energized, the coil 15 generates heat and the heat of the coil 15 is transferred to the Hall element 16. The heat of the coil 15 is also transferred to the Hall element 16 in an adjacent tile-shaped section 11. Therefore, a temperature difference may occur between the Hall elements 16.

The sensitivity of the Hall element 16 decreases as the temperature increases. Therefore, when a temperature difference occurs between the multiple Hall elements 16, a difference in the sensitivity occurs between the multiple Hall elements 16. This may cause the position and orientation of the mover 31 estimated based on the magnetic flux densities detected by the Hall elements 16 to shift from the actual position and orientation of the mover 31. This may reduce the position alignment accuracy of the transfer section 30.

Here, in the planar motor 10 of the present embodiment, a temperature sensor 17 is provided in the housing 14 of the tile-shaped section 11. As the temperature sensor 17, a thermocouple can be used, for example. The detection value of the temperature sensor 17 is input to the controller 160 (see FIG. 1).

Next, the arrangement of the temperature sensors 17 (17A and 17B) will be described with reference to FIG. 4, FIG. 5A, and FIG. 5B. FIG. 4 is an example of a plan view illustrating the arrangement of the temperature sensors 17.

The planar motor 10 of the present embodiment is formed by arranging multiple tile-shaped sections 11. The accuracy-required area 200 is provided on the planar motor 10. The temperature sensor 17A is provided in the accuracy-required area 200 of the planar motor 10.

Figure 5A:
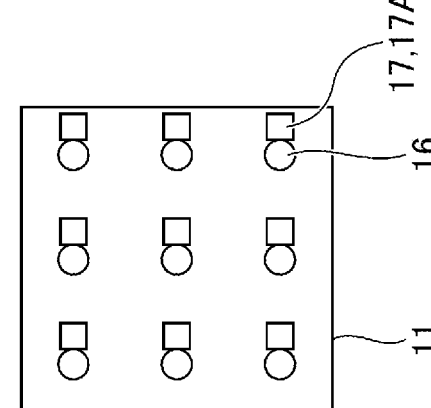
FIG. 5A and FIG. 5B are examples of a plan view illustrating the arrangement of the temperature sensors in a tile in an accuracy-required area.
Figure 5B:
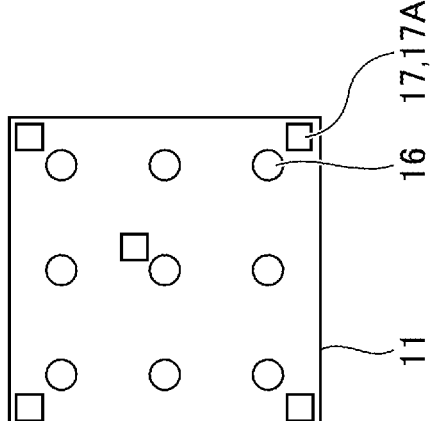

FIG. 5A and FIG. 5B are examples of a plan view depicting the arrangement of the temperature sensors 17A in the tile-shaped section 11 in the accuracy-required area 200.

As illustrated in FIG. 5A, the temperature sensor 17A may be provided individually for each Hall element 16. This allows the temperature of each Hall element 16 in the accuracy-required area 200 to be detected with high accuracy.

Additionally, as illustrated in FIG. 5B, the temperature sensor 17A may be provided for multiple Hall elements 16 in the tile-shaped section 11. For example, in the rectangular tile-shaped section 11, the temperature sensors 17A may be provided at the corners and the center. With this configuration, the temperature distribution in the tile-shaped section 11 in the accuracy-required area 200 can be estimated based on the temperatures detected by the temperature sensors 17A, and the temperature of each Hall element 16 in the accuracy-required area 200 can be estimated. Additionally, the number of temperature sensors 17A can be reduced to reduce the cost of the tile-shaped section 11.

Returning to FIG. 4, in the planar motor 10, the temperature sensor 17B for measuring the temperature distribution in the entirety of the planar motor 10 is provided. For example, in the planar motor 10, formed in a rectangular shape, in which multiple tile-shaped sections 11 are arrayed, multiple temperature sensors 17B may be provided along the outer peripheral edge, and the temperature sensor 17B may be provided at the center of the planar motor 10. With this configuration, the temperature distribution in the planar motor 10 can be estimated based on the temperatures detected by the temperature sensors 17B, and the temperature of each Hall element 16 in the accuracy-required area 200 can be estimated.

Figure 6:
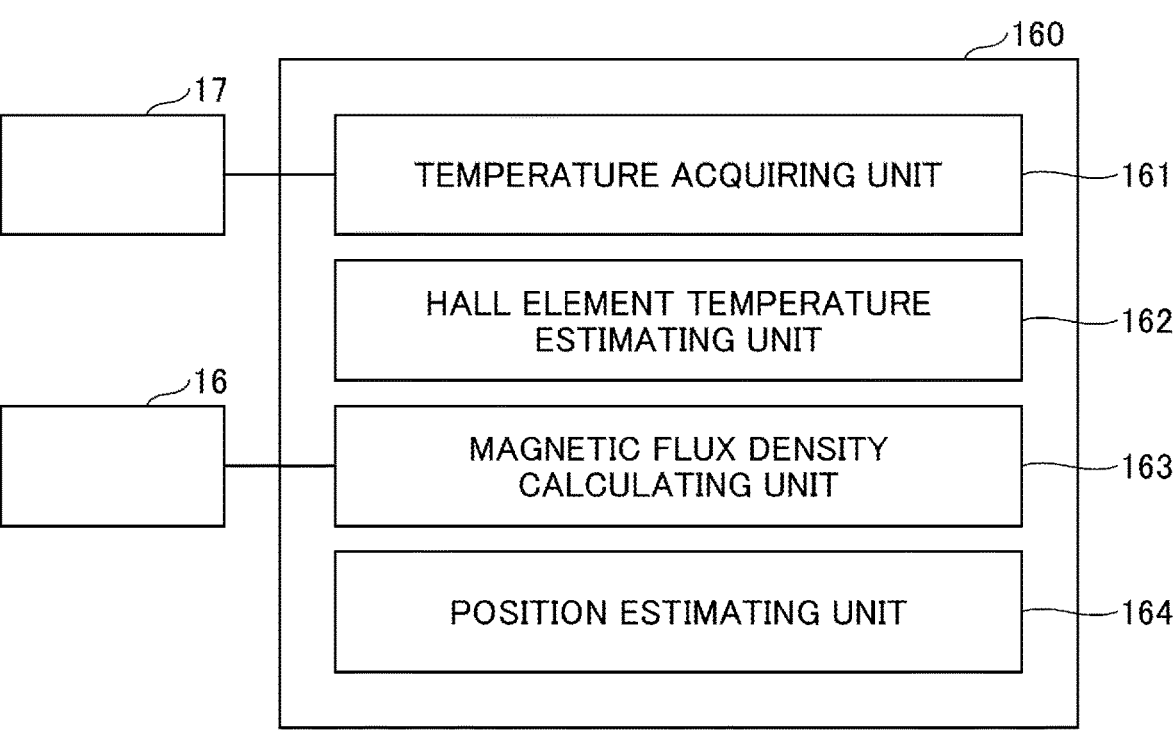
FIG. 6 is an example of a functional block diagram of a controller.

Next, the controller 160 that estimates the position of the transfer section 30 will be described with reference to FIG. 6. FIG. 6 is an example of a functional block diagram of the controller 160. The controller 160 includes a temperature acquiring unit 161, a Hall element temperature estimating unit 162, a magnetic flux density calculating unit 163, and a position estimating unit 164. Here, in the storage unit of the controller 160, the positions of the temperature sensors 17 (17A and 17B) (the temperature measurement positions) and the positions of the Hall elements 16 (the magnetic flux measurement positions) are stored.

The temperature acquiring unit 161 receives the detection values of the temperature sensors 17 and acquires the temperatures at respective temperature measurement positions detected by the temperature sensors 17.

The Hall element temperature estimating unit 162 estimates the temperature of each Hall element 16 based on the temperatures at the respective temperature measurement positions that are acquired by the temperature acquiring unit 161. For example, when estimating the temperature of the Hall element 16 in the accuracy-required area 200, the Hall element temperature estimating unit 162 estimates the temperature distribution of the tile-shaped section 11 in the accuracy-required area 200 based on the temperatures at the respective temperature measurement positions that are detected by the temperature sensors 17A, and estimates the temperature of each Hall element 16 based on the estimated temperature distribution of the tile-shaped section 11. When estimating the temperature of the Hall element 16 in the transfer area 210 (see FIG. 1), the Hall element temperature estimating unit 162 estimates the temperature distribution of the planar motor 10 based on the temperatures at the respective temperature measurement positions that are detected by the temperature sensors 17B, and estimates the temperature of each Hall element 16 based on the estimated temperature distribution of the planar motor 10.

The magnetic flux density calculating unit 163 receives the temperature of each Hall element 16 estimated by the Hall element temperature estimating unit 162 and the detection value of the Hall element 16 (the Hall voltage), and calculates the magnetic flux density detected by the Hall element 16 at each magnetic flux measurement position. Here, the magnetic flux density calculating unit 163 compensates the detection value of the Hall element 16 based on the temperature of the Hall element 16 estimated by the Hall element temperature estimating unit 162 and the temperature characteristics of the Hall element 16. This allows the magnetic flux density calculating unit 163 to calculate the magnetic flux density compensated with the temperature characteristic of the Hall element 16 at each magnetic flux measurement position.

The position estimating unit 164 estimates the position and orientation of the transfer section 30 (the permanent magnet 35) based on the magnetic flux density calculated by the magnetic flux density calculating unit 163.

Figure 7:
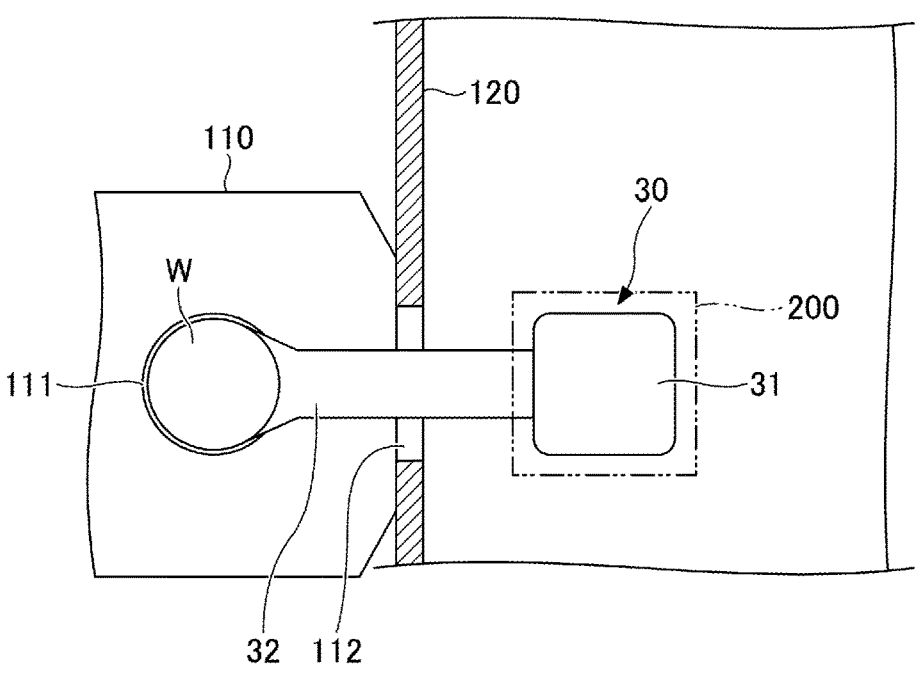
FIG. 7 is an example of a plan view depicting the position alignment of the transfer section that is performed when a substrate is mounted on a stage.

FIG. 7 is an example of a plan view depicting the position alignment of the transfer section 30 that is performed when the substrate W is mounted on the stage 111.

The temperature sensor 17A (see FIG. 4, FIG. 5A, and FIG. 5B) is provided in the accuracy-required area 200. With this configuration, when aligning the transfer section 30 in the accuracy-required area 200, the position of the transfer section 30 can be detected with high accuracy by the correction with the temperature of the Hall element 16. This can improve the position alignment accuracy of the transfer section 30. In addition, the substrate W can be accurately mounted on the stage 111.

Here, as the temperature sensor 17 for detecting the temperature of the Hall element 16, the thermocouple provided in the tile-shaped section 11 has been described as an example, but the sensor is not limited thereto. As the temperature sensor 17 for detecting the temperature of the Hall element 16, for example, a thermal camera that is provided on the ceiling of the vacuum transfer chamber 120 and that images the tile-shaped section 11 in the accuracy-required area 200 may be used. The Hall element temperature estimating unit 162 estimates the temperature of each Hall element 16 based on the temperature distribution of the tile-shaped section 11 imaged by the thermal camera.

Additionally, the Hall element temperature estimating unit 162 may estimate the heating quantity of each coil 15 based on its corresponding energizing quantity. Then, the Hall element temperature estimating unit 162 may estimate the temperature distribution of the tile-shaped section 11 (the planar motor 10) based on the estimated heating quantity of each coil 15 and the temperature at each temperature measurement position detected by the temperature sensor 17, and estimate the temperature of each Hall element 16 based on the estimated temperature distribution of the tile-shaped section 11 (the planar motor 10). With this, the temperature distribution of the tile-shaped section 11 (the planar motor 10) can be estimated in consideration of the heating quantity of the coil 15, so that the temperature of each Hall element 16 can be estimated more accurately. Therefore, the position and orientation of the transfer section 30 can be estimated more accurately.

Figure 8:
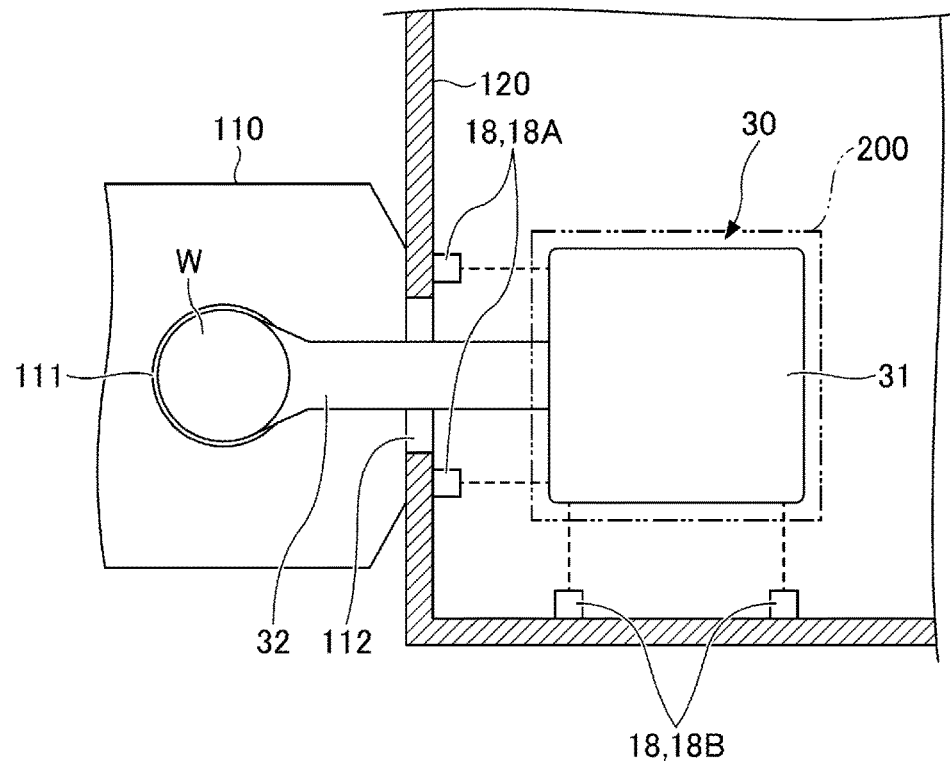
FIG. 8 is another example of a plan view depicting the position alignment of the transfer section that is performed when the substrate is mounted on the stage.

Next, another configuration for improving the position alignment accuracy in the accuracy-required area 200 will be described with reference to FIG. 8. FIG. 8 is another example of a plan view depicting the position alignment of the transfer section 30 that is performed when the substrate W is mounted on the stage 111.

A position detection sensor 18 that detects the position of the transfer section 30 in the accuracy-required area 200 is provided. The position detection sensor 18 is, for example, a laser displacement sensor provided on the side wall of the vacuum transfer chamber 120. The position detection sensor 18 includes two position detection sensors 18A provided on the side wall where the gate valve 112 of the vacuum transfer chamber 120 is located and two position detection sensors 18B provided on another side wall of the vacuum transfer chamber 120, and detects the position and orientation of the transfer section 30 (the mover 31). With this configuration, the position alignment accuracy of the transfer section 30 can be improved. Additionally, the substrate W can be accurately mounted on the stage 111.

Here, as the position detection sensor 18 that detects the position of the transfer section 30 in the accuracy-required area 200, the laser displacement sensor provided on the side wall of the vacuum transfer chamber 120 has been described as an example, but the position detection sensor is not limited thereto. As the position detection sensor 18 that detects the position of the transfer section 30 in the accuracy-required area 200, for example, an imaging device (for example, a CCD camera) that is provided on the ceiling of the vacuum transfer chamber 120 and that images the transfer section 30 in the accuracy-required area 200 may be used.

According to one aspect, a substrate transfer device and a substrate transfer method that improve the transfer accuracy can be provided.

Although the substrate processing system 100 has been described above, the present disclosure is not limited to the above described embodiment and the like, and various modifications and improvements can be made within the scope of the subject matter of the present disclosure as recited in the claims.

What is claimed is:

1. A substrate transfer device comprising:
a planar motor including a plurality of tile-shaped sections, each of the tile-shaped sections including a coil and a Hall element, the planar motor being provided in a transfer chamber;
a transfer section including a permanent magnet, the transfer section being configured to move over the plurality of tile-shaped sections to transfer a substrate, the plurality of tile-shaped sections including a first tile-shaped section including an accuracy-required area where the transfer section delivers or receives the substrate in the transfer chamber and a second tile-shaped section not including the accuracy-required area;
a temperature sensor configured to detect a temperature in the first tile-shaped section; and
a controller configured to estimate a position of the transfer section based on a temperature of the Hall element and a detection value of the Hall element, the temperature of the Hall element being determined based on a temperature distribution of the first tile-shaped section estimated based on the temperature detected by the temperature sensor and an energizing quantity of the coil,
wherein the temperature sensor is provided in the first tile-shaped section, and
wherein the temperature sensor is in contact with the Hall element of the first tile-shaped section.

2. The substrate transfer device as claimed in claim 1, wherein the transfer chamber has the accuracy-required area where a position of the transfer section is aligned, and
wherein the temperature sensor detects the temperature in the accuracy-required area in the first tile-shaped section.

3. The substrate transfer device as claimed in claim 1, wherein the controller estimates a temperature distribution of the first tile-shaped section based on the temperature detected by the temperature sensor, and estimates a temperature of the Hall element based on the estimated temperature distribution.

4. The substrate transfer device as claimed in claim 1, wherein the temperature sensor is a thermocouple provided in the first tile-shaped section.

5. A substrate transfer device comprising:
a planar motor including a plurality of tile-shaped sections, each of the tile-shaped sections including a coil and a Hall element, the planar motor being provided in a transfer chamber;
a transfer section including a permanent magnet, the transfer section being configured to move over the plurality of tile-shaped sections to transfer a substrate, the plurality of tile-shaped sections including a first tile-shaped section including an accuracy-required area where the transfer section delivers or receives the substrate in the transfer chamber and a second tile-shaped section not including the accuracy-required area; and
a controller configured to estimate a position of the transfer section and an orientation of the transfer section based on a detection value of the Hall element,
wherein the transfer chamber includes a position sensor configured to detect a position of the transfer section in the accuracy-required area, and a position alignment of the transfer section is performed in the accuracy-required area, and
wherein the position alignment of the transfer section is performed based on a difference between the estimated position of the transfer section and the detected position of the transfer section and a difference between the estimated orientation of the transfer section and the detected orientation of the transfer section.

6. The substrate transfer device as claimed in claim 5, wherein the position sensor is a laser displacement sensor.

7. A substrate transfer method performed by a substrate transfer device including
a planar motor including a plurality of tile-shaped sections, each of the tile-shaped sections including a coil and a Hall element, the planar motor being provided in a transfer chamber,
a transfer section including a permanent magnet, the transfer section being configured to move over the plurality of tile-shaped sections to transfer a substrate, the plurality of tile-shaped sections including a first tile-shaped section including an accuracy-required area where the transfer section delivers or receives the substrate in the transfer chamber and a second tile-shaped section not including the accuracy-required area, and
a temperature sensor configured to detect a temperature in the first tile-shaped section and provided in the first tile-shaped section, and the temperature sensor being in contact with the Hall element of the first tile-shaped section, the substrate transfer method comprising:
estimating a position of the transfer section based on a temperature of the Hall element and a detection value of the Hall element, the temperature of the Hall element being determined based on a temperature distribution of the first tile-shaped section estimated based the temperature detected by the temperature sensor and an energizing quantity of the coil; and aligning the transfer section based on the estimated position.

\* \* \* \* \*